(12) United States Patent
Shimada (10) Patent No.: US 7,148,922 B2
(45) Date of Patent: Dec. 12, 2006

(54) ELECTRONIC CAMERA WHICH DETECTS FLASH INFLUENCE ON AN IMAGE AND CONTROLS WHITE BALANCE IN ACCORDANCE WITH THE FLASH INFLUENCE

(75) Inventor: Yoshinao Shimada, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 680 days.

(21) Appl. No.: 10/210,234

(22) Filed: Aug. 1, 2002

(65) Prior Publication Data

US 2003/0025822 A1    Feb. 6, 2003

(30) Foreign Application Priority Data

Aug. 2, 2001   (JP) ............... 2001-235156

(51) Int. Cl.
*H04N 9/73* (2006.01)
*H04N 5/222* (2006.01)

(52) U.S. Cl. ............... 348/224.1; 348/223.1; 348/371; 348/370

(58) Field of Classification Search ............ 348/224.1, 348/223.1, 370, 371
See application file for complete search history.

(56) References Cited

U.S. PATENT DOCUMENTS 5,659,357 A * 8/1997 Miyano .................. 348/223.1
5,808,681 A * 9/1998 Kitajima ................. 348/371
6,075,562 A * 6/2000 Sakaguchi et al. ....... 348/223.1
6,151,073 A * 11/2000 Steinberg et al. .......... 348/371
6,654,062 B1* 11/2003 Numata et al. ............ 348/362
6,727,942 B1* 4/2004 Miyano .................. 348/223.1

FOREIGN PATENT DOCUMENTS

| JP | 4-088762 A | 3/1992 |
| JP | 8-289314 A | 11/1996 |
| JP | 8-340542 A | 12/1996 |
| JP | 9-322191 A | 12/1997 |
| JP | 11-113006 A | 4/1999 |
| JP | 2000-102025 A | 4/2000 |

* cited by examiner

*Primary Examiner*—David Ometz
(74) *Attorney, Agent, or Firm*—Frishauf, Holtz, Goodman & Chick, P.C.

(57) ABSTRACT

There is disclosed a constitution in which an area with strobe light rays dominant therein, which corresponds to strobe light dominant area, is extracted in accordance with various extraction conditions, and a white balance adjustment suitable for a property of the area is set in order to enhance a result of an indoor strobe photographing. Moreover, it is judged whether or not correction is appropriate for each white balance area in accordance with a result of evaluation exposure of a steady light amount.

12 Claims, 5 Drawing Sheets

Steady light data

FIG. 4A

Pre-flash data

FIG. 4B

Light control judgment area

FIG. 5A

Fixed area

FIG. 5B

F I G. 6A  Strobe dominant area extraction 1

F I G. 6B  Strobe dominant area extraction 2
($C_{i,j} > T2$)

F I G. 6C  Strobe dominant area extraction 3
($C_{i,j} \times (E_s - E_d) / B > T3$)

ELECTRONIC CAMERA WHICH DETECTS FLASH INFLUENCE ON AN IMAGE AND CONTROLS WHITE BALANCE IN ACCORDANCE WITH THE FLASH INFLUENCE

CROSS-REFERENCE TO RELATED APPLICATIONS

This application is based upon and claims the benefit of priority from the prior Japanese Patent Application No. 2001-235156, filed Aug. 2, 2001, the entire contents of which are incorporated herein by reference.

BACKGROUND OF THE INVENTION

1. Field of the Invention

The present invention relates to an electronic camera for electrically photographing a subject, particularly to an improvement of an apparatus and method in which a white balance of a photographed image is adjusted at a time of photographing a subject using strobe light rays in the electronic camera.

2. Description of the Related Art

There has been known an exposure technique, for example, in Jpn. Pat. Appln. KOKAI Publication No. 8-289314, of detecting a spectral characteristic of a light source for illuminating a subject and automatically adjusting or controlling a white balance to enhance color reproduction of a photographed image in an electronic camera.

As described in Jpn. Pat. Appln. KOKAI Publication No. 2000-102025, a technique of properly adjusting or controlling a white balance for a strobe photographing with a strobe, has also been known.

In the white balance adjustment in the above-described publications, an influence exerted on the photographed image due to a color temperature of light rays from the light source, which is inherent to a light source, can somewhat be suppressed. However, the influence from a dominant light source for the photographing is reflected in the white balance adjustment. Therefore, there is a problem that artificiality remains with respect to some areas in the photographed image little influenced by the dominant light source. For example, the light rays from a fluorescent lamp are mixed with strobe light rays in an indoor photographing. In this case, there is a problem that a deviation is generated in the white balance adjustment in a partial area or areas of a subject irradiated with the strobe light rays and another area or areas of the subject irradiated with the light rays from the fluorescent lamp.

Furthermore, after the photographing, the white balance is adjusted for each area from the image data of the photographed image. In this case, there is also a problem that processing and judgment require much time.

BRIEF SUMMARY OF THE INVENTION

An object of the present invention is to achieve a proper white balance adjustment in a strobe photographing and to enhance a quality of a photographed image.

According to a first aspect of the present invention, there is provided an electronic camera for electrically photographing a subject, comprising:

preliminary illuminating unit configured to illuminate the subject with preliminary light rays;

exposure control section configured to control an exposure of an image relating to the subject illuminated with the preliminary light rays to generate image data;

extracting section configured to extract an block area or areas from the image data, the extracted block area or areas corresponding to a part or parts of the subject, which mainly illuminated with the preliminary light rays; and setting section configured to set a predetermined white balance adjustment with respect to the block area or areas.

According to second aspect of the present invention, there is provided an electronic camera for electrically photographing a subject, comprising:

preliminary illuminating unit configured to illuminate the subject with preliminary light rays;

first selecting section configured to distinctively select one of white balance adjustment modes including an automatic white balance adjustment mode;

extraction section configured to extract predetermined block areas from the image data, the block areas corresponding to parts of the subject, which mainly illuminated with the preliminary light rays;

first setting section configured to set a first white balance adjustment related to the predetermined extracted block area;

second setting section configured to set a second white balance adjustment different from the first white balance adjustment with respect to the another block areas in the image data; and second selecting section configured to select one of the first and second setting sections in accordance with the selected the one of the white balance adjustment modes.

According to third aspect of the present invention, there is provided an electronic camera for electrically photographing a subject, comprising:

preliminary illuminating unit configured to illuminate the subject with preliminary light rays;

first selection section configured to distinctively select one of illumination modes including an automatic flash illumination mode;

extraction section configured to extract a predetermined block areas from the image data, the block areas corresponding to parts of the subject, which mainly illuminated with the preliminary light rays;

first setting section configured to set a first white balance adjustment related to the predetermined extracted block area;

second setting section configured to set a second white balance adjustment different from the first white balance adjustment with respect to the another block areas in the image data; and second selecting section configured to select one of the first and second setting sections in accordance with the selected the one of the illumination modes.

According to fourth aspect of the present invention, there is provided an electronic camera including a strobe, comprising:

preliminary exposure configured to perform a steady light preliminary exposure by steady light rays and perform a pre-flash preliminary exposure accompanied by a strobe light illumination in response to a photographing preparation operation;

judgment section configured to judge whether a image area influenced dominantly by strobe light rays exceeds a predetermined ratio with respect to a whole exposure image area based on a steady light preliminary exposure result and pre-flash preliminary exposure result; and white balance setting section configured to apply a white balance condition for the strobe light rays different from a white balance condition for steady light rays to an area influenced dominantly by the strobe light rays during a strobe photographing, when the judgment means judges the area influenced dominantly by the strobe light rays to exceed the predetermined ratio with respect to the whole exposure image area.

According to fifth aspect of the present invention, there is provided an exposure method of an electronic camera including a strobe, comprising the steps of:

performing a steady light preliminary exposure by steady light rays and performing a pre-flash preliminary exposure accompanied by a strobe light illumination in response to a photographing preparation operation;

judging whether a image area influenced dominantly by strobe light rays exceeds a predetermined ratio with respect to a whole exposure image area based on a steady light preliminary exposure result and pre-flash preliminary exposure result; and applying a white balance condition for the strobe light rays different from a white balance condition for steady light rays to an area influenced dominantly by the strobe light rays during a strobe photographing, when the judgment step judges the area influenced dominantly by the strobe light rays to exceed the predetermined ratio with respect to the whole exposure image area.

Additional objects and advantages of the invention will be set forth in the description which follows, and in part will be obvious from the description, or may be learned by practice of the invention. The objects and advantages of the invention may be actualized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An electronic camera according to an embodiment of the present invention will be described hereinafter with reference to the drawings.

Figure 1:
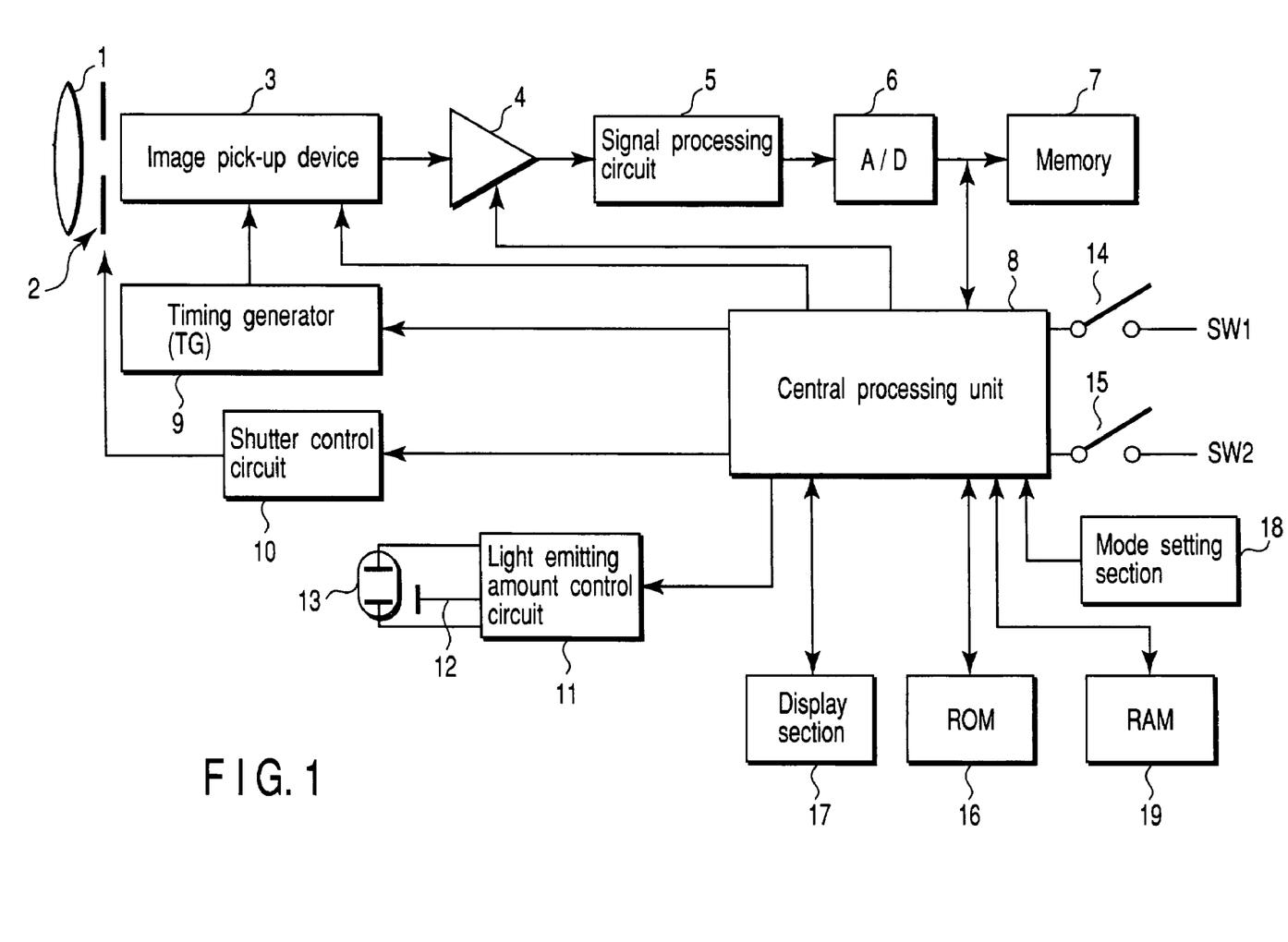
FIG. 1 is a block diagram showing a configuration of an electronic camera according to one embodiment of the present invention.

FIG. 1 is a block diagram showing a constitution of the electronic camera according to one embodiment of the present invention.

The electronic camera shown in FIG. 1 comprises a photographing lens 1 faced to a subject (not shown) to be photographed, for transmitting a subject image from the subject to a solid-state image pick-up device 3 such as a charge coupled device (CCD), and a shutter 2 disposed between the photographing lens 1 and solid-state image pick-up device 3, which also serves as an aperture diaphragm for restricting incident light rays directed to the solid-state image pick-up device. During the photographing, the subject image transmitted from the photographing lens 1 is formed on the solid-state image pick-up device 3, and the subject image is picked up in the image pick-up device 3. The image pick-up device 3 electrically converts the picked-up subject image into a main image signal and outputs the main image signal.

An amplification circuit 4 amplifies the image signal from the image pick-up device 3 at a certain amplification factor, and the image signal amplified by the amplification circuit 4 is sample-held by a signal processing circuit 5. The image signal from the signal processing circuit 5 is analog/digital converted by an A/D circuit 6 and outputted as digital image data, and the image data outputted from the A/D circuit 6 is stored in a memory 7.

An output signal from the A/D circuit 6 or memory 7 is supplied to a central processing unit (CPU) 8, and the central processing unit (CPU) 8 calculates a light amount of a strobe light tube 13, for example, a Xe tube, based on the output signal. Moreover, the central processing unit (CPU) 8 determines an appropriate amplification factor based on the output signal from the A/D circuit 6 or memory 7, supplies an amplification control signal corresponding to the determined amplification factor to the amplification circuit 4 and controls the amplification factor of the amplification circuit 4. The central processing unit (CPU) 8 controls each constituting component of the electronic camera in this manner.

The electronic camera further includes a timing generator (TG) 9 which generates a timing signal for driving the image pick-up device 3, and a shutter control circuit 10 which controls the opening/closing of the shutter 2 under control of the CPU 8. The CPU 8 supplies a signal for controlling the photographing to the timing generator (TG) 9 and shutter control circuit 10. The shutter 2 is opened/closed at a predetermined timing, and the subject image is formed on the image pick-up device 3. For the image signal of the subject, the timing generator (TG) 9 outputs vertical and horizontal drive signals. Moreover, during the strobe light illumination, the central processing unit (CPU) 8 supplies a timing control signal to a light control circuit 11 for controlling the light rays from the strobe tube 13. In response to the timing control signal, the light control circuit 11 supplies a trigger signal to a trigger electrode 12 of the strobe 13, causes the strobe to start to flash light rays, and controls the light illumination amount of the strobe tube 13 in accordance with the calculated exposure value.

A strobe mode signal is inputted into the CPU 8 via a strobe mode switch (SW1) 14 and a strobe mode is set. Moreover, a release signal is similarly inputted into the CPU 8 via a release switch (SW2) 15, that is, a photographing start switch. In response to the release signal, the CPU 8 executes various controls related to the photographing. The CPU 8 is connected to a ROM 16 in which predetermined values related to the strobe light illumination and various control routines are stored.

When the strobe mode switch (SW1) 14 is turned on, the CPU 8 issues a strobe illumination command to the light control circuit 11 in response to an ON signal. Moreover, when the release switch 15 is turned on, the CPU 8 starts the photographing operation in response to the ON signal.

Furthermore, the central processing unit (CPU) 8 is connected to a setting section 18 for setting various modes described later, a display section 17 for displaying a picked-up image or information for various settings, and a RAM 19 for temporarily storing arithmetic results in the central processing unit (CPU) 8.

In the electronic camera shown in FIG. 1, the strobe tube 13 pre-flashes before emitting main-flash light rays for the actual exposure. The pre-flash light rays form a preliminary subject image of the subject on the image pick-up device 3. The preliminary subject image is converted to a preliminary image signal, and the preliminary image signal is outputted from the image pick-up device 3 and is also subjected to the signal processing and A/D conversion, thus preliminary image data being stored in the memory 7. For the preliminary image data, a image area is divided into a plurality of block areas as described later, and the data is acquired and calculated for each block areas by the CPU 8. The data for each block is used in a strobe light control for obtaining the value concerning the strobe light amount of an actual exposure time, and is also used in an operation for extracting the block areas whose white balance is to be determined.

Figure 2:
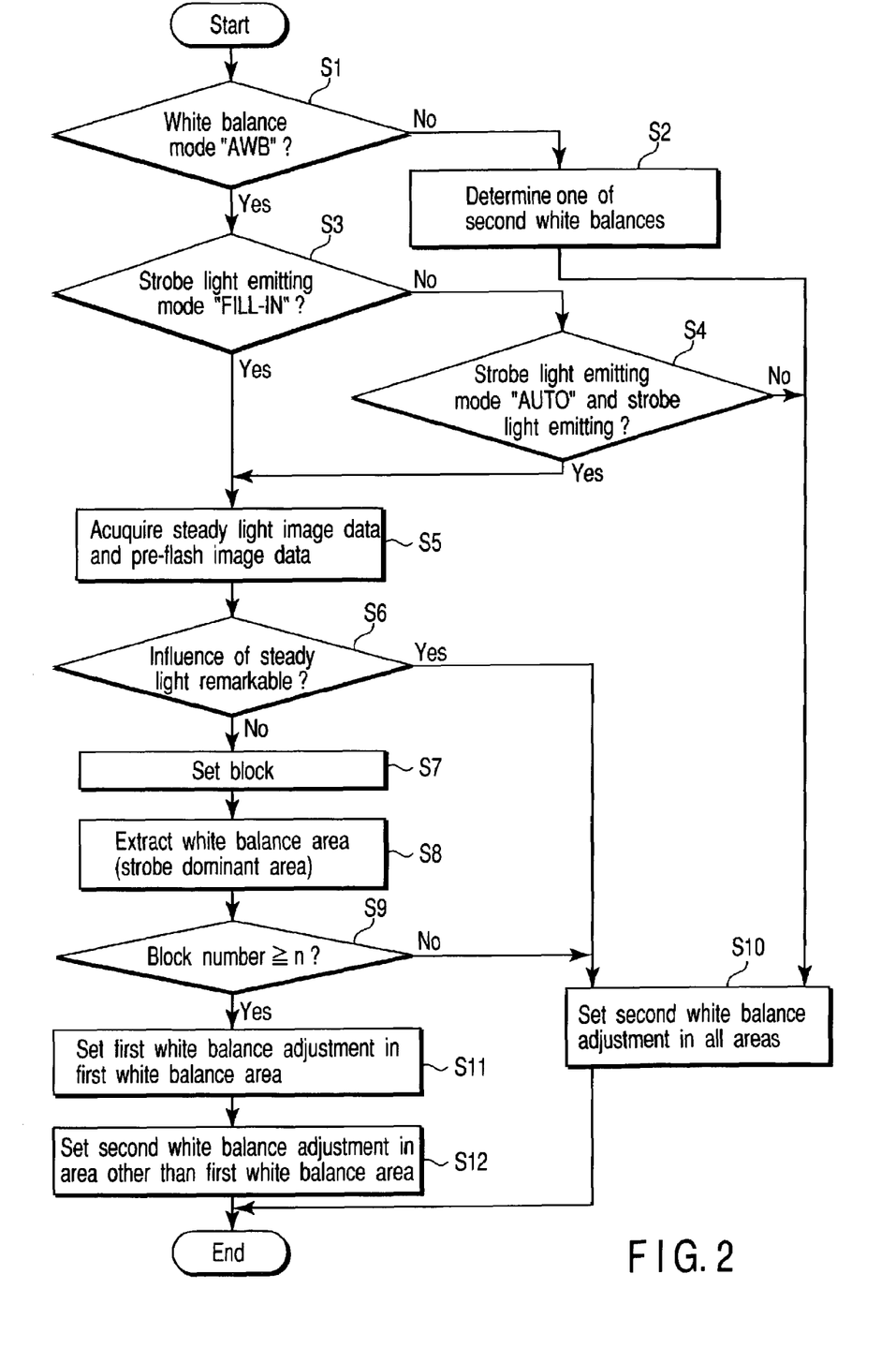
FIG. 2 is a flowchart showing a flow of processing of extracting white balance block areas in the electronic camera shown in FIG. 1.

In the electronic camera shown in FIG. 1, when a strobe mode for emitting strobe light rays is set or when an automatic white balance mode (AWB mode) for automatically adjusting the white balance is set and it is determined that the strobe is caused to emit strobe light rays in the automatic white balance mode (AWB mode), a specific white balance adjustment is set and executed as shown in FIG. 2. In a normal white balance adjustment, one white balance is determined for the steady light rays or strobe light rays in the whole image area, and the white balance of the whole image area is adjusted with one white balance. On the other hand, in the specific white balance adjustment, predetermined block areas in which the strobe light rays are dominant are extracted from the photographing image area, and are adjusted with a first white balance. Other block areas are adjusted with one of second white balances. Here, a first white balance adjustment is determined for the strobe light rays, and one of second white balance adjustments is determined based on a color temperature of the steady light rays with which the other areas are irradiated. Here, the steady light rays include natural light rays, and light rays from a fluorescent lamp or special light source. One of the second white balances is determined in accordance with the color temperature of the steady light rays, that is, the natural light rays or the light rays from the fluorescent lamp or special light source.

The strobe mode includes three modes an automatic illumination mode "AUTO" in which the strobe light rays are automatically flashed in accordance with brightness of the subject, an OFF mode "OFF" in which the strobe light flashing is prohibited; and a forced illumination mode "FILL-IN" in which the strobe is forced to flash the strobe light rays regardless of the brightness of the subject. These modes are set by the mode setting section 18 and display section 17 shown in FIG. 1. That is, to set the strobe mode by the mode setting section 18, when a mode setting key of the mode setting section 18 is depressed, a selection image area of each type of mode is displayed in the display section 17. When a selection key of the mode setting section 18 is used to select the strobe mode in the mode selection image area displayed in the display section 17, the automatic illumination mode "AUTO", OFF mode "OFF" and forced illumination mode "FILL-IN" are displayed in the display section 17. When the selection key of the mode setting section 18 is used to select any mode, the selected mode is set into the RAM 19.

Moreover, the white balance mode includes two modes: the automatic white balance mode "AWB" in which the white balance is automatically set; and a manual white balance mode "MWB" in which the white balance is manually set. This white balance mode is set by the mode setting section 18 and display section 17 shown in FIG. 1 similarly as the strobe mode. That is, when the selection key of the mode setting section 18 is used to select the white balance mode in the mode selection image area displayed in the display section 17, the automatic white balance mode "AWB" and manual white balance mode "MWB" are displayed in the display section 17. When the selection key of the mode setting section 18 is used again to select any mode, the selected white balance mode is set in the RAM 19. In the "AWB" mode, the color temperature characteristic is automatically corrected so that the white balance is properly set, even if the color temperature influences the subject color image.

Additionally, the above-described selection modes can be individually selected. In this case, the white balance is selected in preference to the strobe mode.

A procedure of a processing the image data and extracting the white balance area for adjusting the white balance in the electronic camera shown in FIG. 1 will be described with reference to FIG. 2.

FIG. 2 is a flowchart showing a flow of processing procedure of extracting the white balance area in the electronic camera shown in FIG. 1.

As shown in FIG. 2, when the processing is started, it is judged in step S1 whether or not the white balance mode is set to the automatic white balance (AWB) mode. When the mode is not the "AWB" mode, the manual white balance mode is set. Therefore, in the extraction processing, as shown in step S2, the manually set white balance is determined as specified one of second white balances. For example, when the photographing under the fluorescent lamp is manually set, the white balance with respect to the fluorescent light rays is determined to correspond to the specified one of the second white balances in this processing.

In the step S1, when the white balance mode is the "AWB" mode, it is judged in step S3 whether or not the strobe mode is set to the forced illumination mode "FILL-IN" mode. When the mode is not the "FILL-IN" mode in this step S3, as shown in step S4, the strobe mode is set to the strobe automatic illumination "AUTO" mode. Moreover, it is judged whether or not the strobe emits the light rays.

When the mode is the OFF mode other than the "FILL-IN" and "AUTO" modes as shown in steps S3 and S4, or when the strobe mode is set to the strobe automatic illumination "AUTO" mode as shown in the step S4 but the strobe does not emit the light rays as a result of photometry, as shown in step S10, the white balance adjustment in the second white balance mode specified in the step S2 is set with respect to all the block areas of the image data and a series of processing is ended.

When the "FILL-IN" mode is set in the step S3, the strobe pre-flashes for the processing in step S5. Similarly, when the strobe mode is set to the strobe automatic light emitting "AUTO" mode and the strobe is set to emit the light rays in the step S4, the strobe similarly pre-flashes for the processing of the step S5.

In the step S5, steady image data obtained from the steady light rays is acquired prior to the pre-flash. Thereafter, the subject is irradiated with the pre-flash and the preliminary image data is acquired. In step S6, the steady light rays are compared with the strobe light rays of the pre-flash from the steady and preliminary image data. It is judged whether the steady light rays in the light rays reflected from the subject have a larger influence on the picked-up image than the strobe light rays for the actual photographing, which are estimated by the CPU. When the picked-up image is formed dominantly by the steady light rays in the step S6, as shown in the step S10, the white balance adjustment in the second white balance mode specified in the step S2 is set with respect to all the areas of the image data, and a series of processing is ended.

If the strobe light rays are expected to mainly form the picked-up image, in the step S6, which is not formed dominantly by the steady light rays, 8×8 block areas are defined in the image data in step S7 as described later. In this case, the block area or areas in which the strobe light rays are dominant are extracted from the pre-flash image as shown in step S8. That is, the block areas in which the image is formed by the strobe light rays are specified, and extracted.

As shown in step S9, it is judged whether the number of the extracted block areas is larger than a predetermined number n. When the number of block areas is smaller than the predetermined number n, the strobe light rays is not expected to dominantly form the image, and the processing is shifted to the step S10. The whites balance adjustment in the second white balance mode specified in the step S2 is set with respect to all the area of the image data, and a series of processing is ended.

When the number of block areas is larger than the predetermined number n in the step S9, the strobe light rays is expected to form the picked-up image dominantly. Therefore, in step S11, the specific block areas on the image pick-up device corresponding to the block areas extracted in the step S9 is determined as the first white balance area, and the specific block areas are set as the area to be adjusted by the first white balance. Moreover, in step S12, another block areas on the image pick-up device corresponding to the area other than the block areas extracted in the step S9 is determined as the second white balance area, and the another block areas is set as the area to be adjusted by the second white balance. When the first and second white balance adjustments are set in the steps S11 and S12, a series of processing is ended.

Figure 3A:
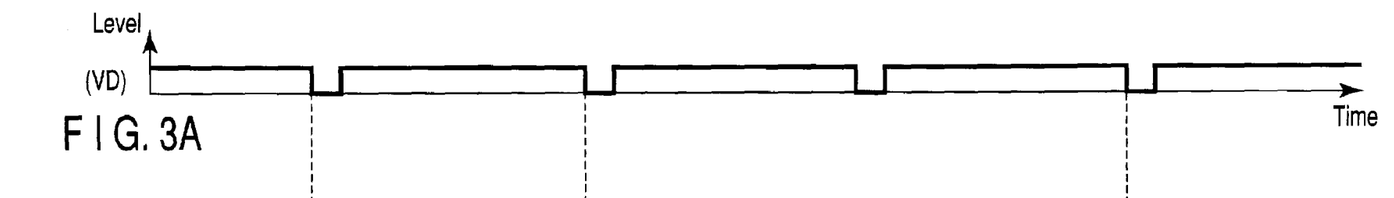
FIGS. 3A to 3C are timing charts showing timings of exposure and strobe light illumination in the electronic camera shown in FIG. 1.

An operation of the electronic camera will next be described with reference to FIGS. 3A to 3C, wherein the steady image data is obtained from only the steady light rays and the pre-flash image data is obtained from not only the steady light rays but also the pre-flash light rays. Here, FIGS. 3A to 3C are timing charts showing timings of exposure and strobe light illumination in the electronic camera shown in FIG. 1.

Figure 3B:
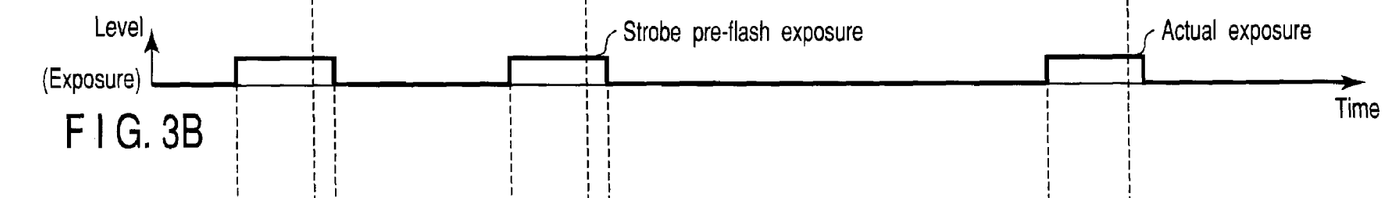
Figure 3C:
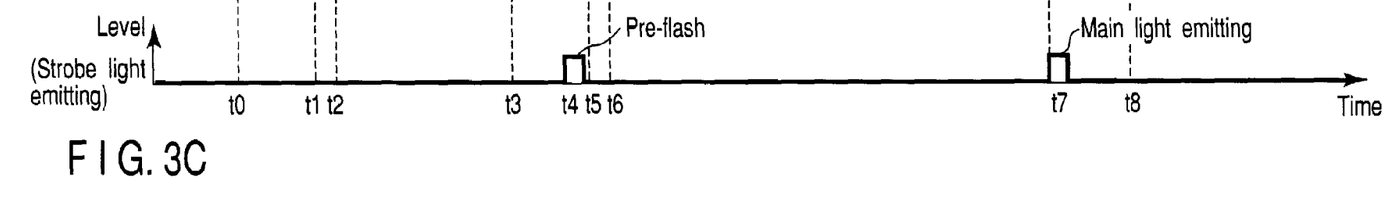

To acquire the image data by the steady light rays, as shown in FIG. 3B, the subject image of to the steady light rays is exposed on the image pick-up device 3 for a predetermined period t0 to t2, and a steady light image is specified. The subject image is outputted from the image pick-up device 3 by a vertical drive signal supplied to the image pick-up device 3 at the timing t1 as shown in FIG. 3A, and is temporarily stored as the steady light image data in the memory 7. Thereafter, the exposure is started at a predetermined timing t3 and ended at a predetermined timing t6 as shown in FIG. 3B, and the strobe 13 pre-flashes at a timing t4 in a period t3 to t6 as shown in FIG. 3C. Therefore, in the exposure period t3 to t6, the subject image based on the pre-flash is exposed on the image pick-up device 3, and the pre-flash image is specified. The preliminary subject image is outputted from the image pick-up device 3 by the vertical drive signal supplied to the image pick-up device 3 at the timing t5 as shown in FIG. 3A, and is temporarily stored as the pre-flash image data in the memory 7.

Thereafter, as shown in the step S5 described above with reference to FIG. 2, the steady light image data and pre-flash image data are compared and the first and second white balance adjustments are set. As shown in FIG. 3C, the strobe 13 performs a actual light emitting at a certain timing t7 after the adjustment is set, and the subject image is subjected to actual exposure on the image pick-up device 3 as shown in FIG. 3B. The subject image generated by the actual exposure is outputted from the image pick-up device 3 by the vertical drive signal generated at a timing t8 as shown in FIG. 3A, and is stored as main image data in the memory 7.

Figure 4A:
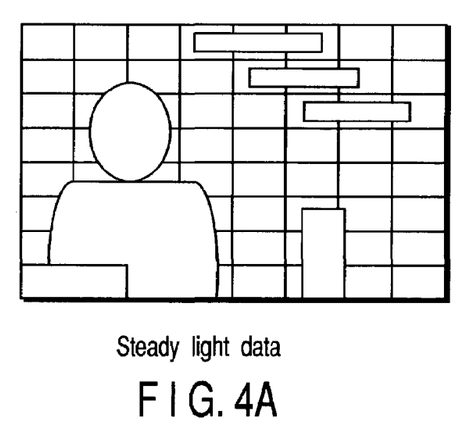
FIGS. 4A and 4B are explanatory views schematically showing picked-up image data obtained by exposure of steady light rays, and picked-up image data obtained by exposure of a preliminary strobe light rays, with showing extracted block areas and another block areas in comparison to one another, in the electronic camera shown in FIG. 1.
Figure 4B:
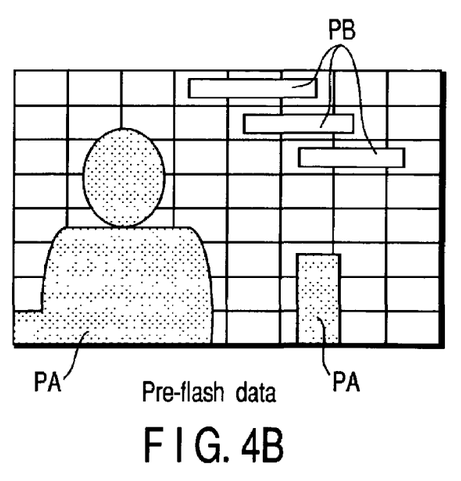
Figure 5A:
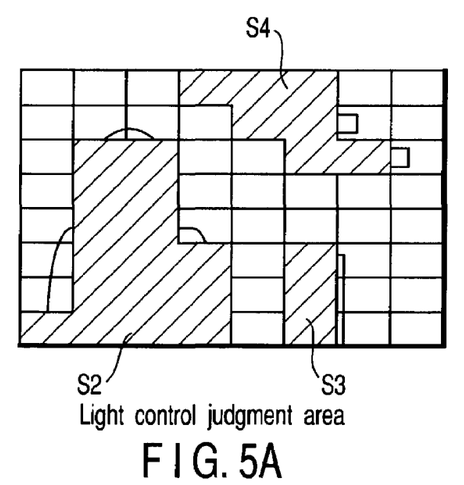
FIGS. 5A and 5B are diagrams schematically showing extraction results of photometry exposure data for determining an exposure amount for actual exposure in the electronic camera shown in FIG. 1.
Figure 5B:
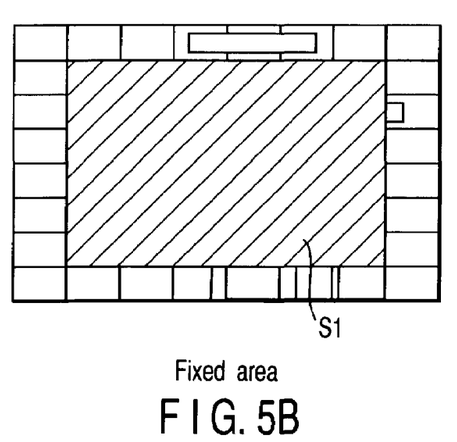

In the step S5 shown in FIG. 2, at a predetermined timing after the exposure for evaluation of a steady light amount is performed, a strobe actuating signal is usually turned on, and the pre-flash is executed. A necessary light amount of a pre-flash time may be obtained in a method described, for example, in Jpn. Pat. Appln. KOKAI Publication No. 4-88762. Here, an exposure value is evaluated from the amount of the steady light rays and the pre-strobe light rays to determine an amount of the strobe light rays in the actual exposure. Here, the amount of the steady light rays and the amount of the strobe light rays may be determined based on the image data of the block areas (e.g., 6×6 block areas in a middle portion of the image data area) fixed beforehand as shown in FIG. 5B. Alternatively, as shown in FIG. 5A, the amount of the strobe light rays may be determined based on the block areas S2, S3, S4, the block areas S2, S3, S4 constituting a main part of the subject to be illuminated by the strobe light rays and being extracted based on the image data as shown in FIG. 4B, which is obtained by the pre-flash light rays and, if necessary, the image data as shown in FIG. 4A, which is obtained by the steady light rays, and the amount of the steady light rays. The area for use in acquiring the photometry information may be different from the area of the white balance adjustment. To obtain a target light illumination amount, that is, a light control target value Es from the exposure data obtained from the evaluation exposure of the steady light rays and the pre-flash illumination, the CPU 8 calculates a multiple of the pre-flash amount as the necessary strobe light amount in the actual exposure. FIG. 4A shows the picked-up image obtained by the exposure for evaluating the steady light amount not accompanied by the strobe illumination, and FIG. 4B schematically shows an irradiation result of the strobe light rays by the pre-flash. Symbol PA in FIGS. 4A and 4B denotes the image data of the subject in which the light amount of the strobe light rays is dominant, and symbol PB denotes the image data which is little influenced by the light amount of the strobe light rays and in which the light amount of the steady light rays is dominant.

The subject images shown in FIGS. 4A and 4B do not have to be exposed on the same conditions. Additionally, the subject image shown in FIG. 4B may be obtained under the condition that the preliminary exposure data can be acquired from the pre-flash light rays in order to set the white balance adjustment and the block areas which are dominantly exposed by the strobe light rays can be detected in the image of the preliminary exposure data. For example, an accumulation period for acquiring the image of FIG. 4B is set to be shorter than that of the image of FIG. 4A, and components corresponding to the steady light rays may be removed from the image data obtained by both the steady light rays and the pre-flash light rays, in accordance to a ratio of the accumulation periods. Alternatively, the image of FIG. 4B may be so acquired in a short accumulation time and be so detected as to decrease the substantially accumulation of the steady light rays and substantially exert no influence of the steady light rays on the image.

Moreover, in FIGS. 4A to 5B, the whole image area is defined by 8×8 block areas, and the judgment for extracting the block areas for the evaluation exposure or the area for setting the white balance adjustment described later is performed based on the image data included in each block areas.

In the white balance adjustment according to the embodiment of the present invention, it is judged whether or not the white balance is to be corrected for each group of block areas in accordance with the image data picked up by the exposure for evaluating the steady light amount, that is, the steady light rays. Here, a ratio of an average value averEd of the steady light amount obtained by the exposure for evaluating the steady light amount to a target light illumination amount Es is compared with a predetermined threshold value T1, for example, 0.3. As shown in the step S4 of FIG. 2, it is judged whether the influence of the steady light amount in the image area is large/small. Here, the average value averEd of the steady light amount corresponds to an average value of the light amount of steady light rays in an area S1 shown in FIG. 5B, and the target light illumination amount Es corresponding to the average value averEd may similarly correspond to a target light amount in the area S1 shown in FIG. 5B. Instead of the area S1 shown in FIG. 5B, the average value averEd of the steady light amount corresponds to the average value of the steady light amount in areas S2, S3, S4 shown in FIG. 5A, and the target light illumination amount Es corresponding to the average value averEd may similarly correspond to the target light amount in the areas S2, S3, S4 shown in FIG. 5A.

When the ratio of the steady light average value averEd to the target light illumination amount Es is smaller than the predetermined threshold value T1 (averEd/Es<T1), as shown in the steps S5 to S8 of FIG. 2, the white balance area is extracted, and appropriate first and second white balance adjustments are set in an extracted first group of block areas and remaining second group of block areas. Here, averEd/Es<T1 means that a subject brightness is insufficient for photographing the subject with the steady light rays and the subject cannot be photographed unless using the strobe light rays. That is, it is meant that the strobe light rays are dominant in the image.

On the other hand, when the ratio of the average value averEd to the target light illumination amount Es is larger than or equal to the predetermined threshold value T1 (averEd/Es≧T1), as shown in the step S6 of FIG. 2, the influence of the steady light rays is judged to be sufficiently large in the image area. Therefore, it is sufficient to set the automatic white balance adjustment by one of the second white balances into the all areas of the image, and therefore the second white balance adjustment is executed. Here, averEd/Es≧T1 means that the subject brightness is slightly low in photographing the subject with the steady light rays, the strobe light rays substantially compensate for the brightness and the subject is not irradiated with high intensity light rays. That is, it is meant that the strobe light rays are not dominant in the image. For example, even when the "FIL-LIN" mode is selected, but when steady light rays Ed have brightness close to the target light illumination amount Es, the influence of the strobe light illumination is small in the obtained image data during the actual exposure. Therefore, it is unnecessary to set the white balance adjustment in which the block areas are extracted and the strobe light illumination is considered, that is, the white balance adjustment in the first white balance inherent to the strobe. When the first white balance adjustment is unnecessary in this manner, the second white balance adjustment using one of the second white balances is performed in order to shorten a processing time. Additionally, when it is unnecessary to judge the influence of the steady light amount in the image area, the processing of the step S6 may be omitted.

When the ratio of the steady light average value averEd to the target light illumination amount Es is smaller than the predetermined threshold value T1 (averEd/Es<T1) in the step S4, it is determined that the image area is separated into the first group of block areas to be extracted and remaining second group of block areas in step S7. Following the determination of separating the area into the first and second groups of block areas, it is judged whether to set the white balance adjustment appropriate for each group with respect to the first and second groups of block areas in accordance with the number of block areas in the first group in the step S9. As shown in the step S8, the first group of block areas in which the influence of strobe light rays is dominant are extracted as the areas to be adjusted with the first white balance. As a method of extracting the first and second groups of white balance areas, there are the following three methods. These three methods will be described with reference to FIGS. 6A to 6C.

Figure 6A:
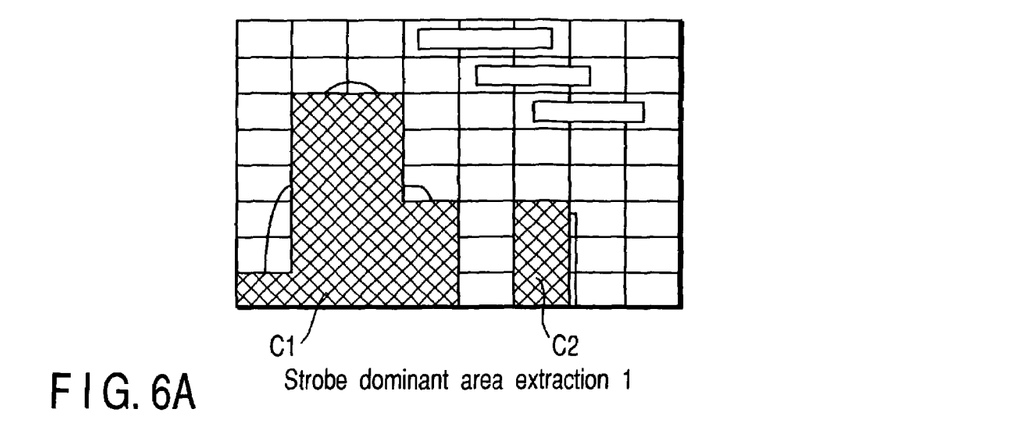
FIGS. 6A, 6B and 6C are diagrams schematically showing the extraction results of a white balance adjustment block area in the electronic camera shown in FIG. 1.

In a first method, as shown in FIG. 6A, a photometry value of each block areas obtained by the pre-flash, that is, an exposure evaluated value $C_{i,j}$ ($i,j=1$ to 8) is obtained. Here, as shown in FIG. 6A, the image area is divided into 8×8 block areas, each block areas (i, j) is specified by row i and column j, and the photometry value is represented by $C_{i,j}$.

Moreover, for the photometry value for the actual exposure, when an average value per block areas obtained from the areas S1 to S4 in the image area shown in FIG. 5A is T0, the exposure evaluated value $C_{i,j}$ is compared with a value T. Additionally, $C_{i,j}$ corresponds to an exposure integrated value obtained from the image data included in each block areas.

In this method, a block areas in which $C_{i,j}>T0$ is established, that is, a block areas in which the strobe light rays are dominant is extracted as a first white balance area, and a block areas in which $C_{i,j}≦T0$ is established is determined as the second white balance areas C1, C2 shown by hatching in FIG. 6A correspond to the first white balance area extracted by the method, that is, the area in which the strobe light rays are dominant. Additionally, to exclude a high-brightness point or part such as the sun from the first white balance area, the block area or areas including the high-brightness point or part is determined as a high-brightness block area or areas beforehand, and the exclusion of the high-brightness block area or areas from the block areas in which $C_{i,j}>T0$ is established, may be set as an extraction condition.

Figure 6B:
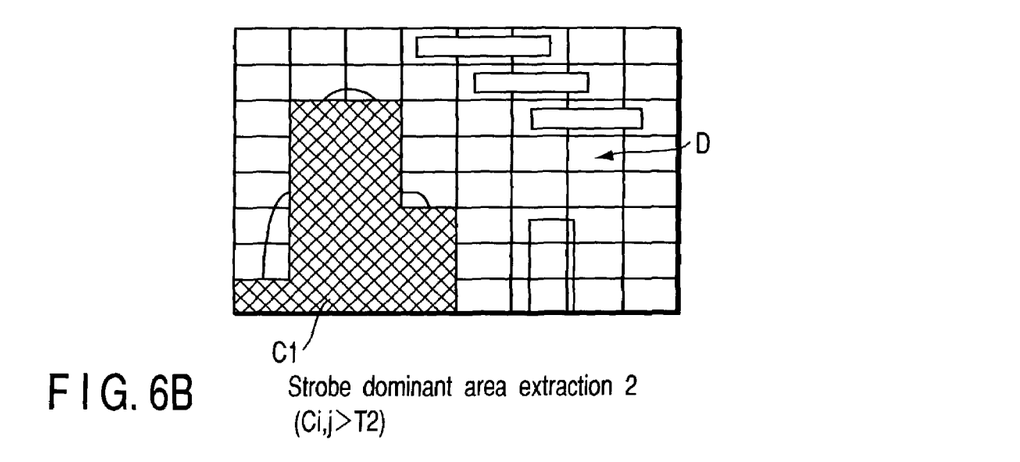

A second method includes: assuming that the evaluated value of each block areas obtained by the pre-flash amount evaluation exposure is Ci,j (i,j=1 to 8), a photometry value exposure amount of each divided block areas obtained by the steady light amount evaluation exposure is Edi,j (i,j=1 to 8), and a predetermined threshold value is T2; and comparing the evaluated value Ci,j with the threshold value T2 and extracting the first white balance area. This method includes: extracting a block in which Ci,j>T2 is established as the first white balance area; and setting a block in which Ci,j≦T2 is established as the second white balance area. Here, the threshold value T2 is defined as an average value of the evaluated value Ci,j of n block areas obtained by the pre-flash, that is, a certain value (T2=kB) obtained by multiplying the strobe evaluated value (B=ΣCi,j/n) by a certain coefficient k. According to the second method, as shown in FIG. 6B, area C1 is extracted as the first white balance area, and another area D is judged to correspond to the second white balance area.

A third method includes: assuming that the evaluated value of each divided block obtained by the pre-flash is Ci,j (i,j=1 to 8), the evaluated value of each block areas obtained from the evaluation exposure by the steady light rays is Edi,j (i,j=1 to 8), and the threshold value is T3; and comparing a value obtained by standardizing the evaluated value Ci,j with the threshold value T3 and extracting the first white balance area. In standardization, a strobe evaluated value B represented by B=ΣCi,j/n is introduced (Ci,j is the photometry value of the block areas in the area S1 shown in FIG. 5B or areas S1, S2, S3 shown in FIG. 5A, that is, the evaluated value and n denotes the number of blocks).

Figure 6C:
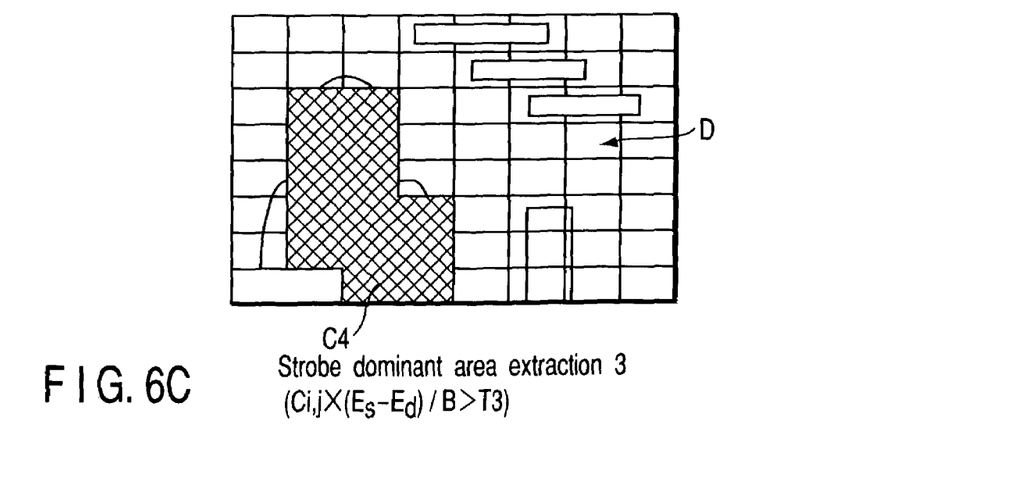

The third method includes: comparing the value standardized by Ci,j×(Es−Edi,j)/B with T3. The block areas in which Ci,j×(Es−Ed)/B>T3 is established is extracted as the first white balance area. Moreover, the block areas in which Ci,j×(Es−Ed)/B≦T3 is established is extracted as the second white balance area. As shown in FIG. 6C, a hatched area C4 corresponds to the first white balance area extracted by the third method.

In the third method, the light amount condition for each photographing can be reflected in extracting the area. Therefore, predetermined block areas in the subject image can advantageously be extracted with a high precision, wherein the illumination is controlled but the strobe light rays are not dominant in the predetermined subject image formed by mixture of the strobe light rays and the light rays from the fluorescent lamp in the background. It is more preferable that the white balance adjustment subsequently is performed based on this block area extraction.

Additionally, after the steps shown in FIG. 2, the image data on the actual exposure is subjected to an adjustment based on the first and/or second white balance adjustments set for each block areas. Additionally, for example, a technique described in Jpn. Pat. Appln. KOKAI Publication No. 11-113006 may be used in the above-described white balance adjustment. Moreover, it is more preferable to perform a smoothing processing with respect to the vicinity of a block boundary in consideration of a change in the boundary of each extracted block area in the white balance adjustment.

As described above, according to the electronic camera of the present embodiment, only the dominant area of the strobe light rays is extracted based on the block area data (photometry value) obtained by the pre-flash, and the white balance adjustment can be set in accordance with the characteristics of the strobe. Therefore, a deviation is not generated in the white balance under circumstances wherein the light rays of the indoor fluorescent lamp are mixed with the strobe light rays. Therefore, there can be provided the electronic camera in which the appropriate white balance processing is performed during the strobe light control under various light sources.

Additionally, variations concerning various constituting portions illustrated in the embodiment of the present invention can also appropriately be combined and carried out.

Moreover, the embodiment of the present invention includes the inventions relating to various viewpoints, stages, ideas or categories, such as the invention as a separate apparatus, the invention including two or more related apparatuses, the invention as a whole system, the invention concerning constituting components inside the separate apparatus, and the invention of the corresponding method.

Therefore, it is possible to extract the invention from the contents disclosed in the embodiment of the present invention without limiting to any illustrated constitution.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An electronic camera for electrically photographing a subject, comprising:
   an illuminating unit configured to illuminate the subject with preliminary light rays, and to illuminate the subject with main light rays for actual exposure after illumination by the preliminary light rays;
   an exposure control section configured to control an exposure of an image of the subject illuminated with the preliminary light rays to generate preliminary light image data, and to control an exposure of an image of the subject illuminated with the main light rays to generate main image data;
   an extracting section configured to extract first block areas from the preliminary image data such that the first block areas correspond to a part of the subject which is mainly illuminated with the preliminary light rays in the preliminary image data; and
   a setting section configured to set a first white balance adjustment which is applied to second block areas in the main image data that correspond to the first block areas in the preliminary image data;
   wherein the first white balance is set before the exposure of the image of the subject illuminated with the main light rays, and a white balance of the second block areas in the main image data is adjusted in accordance with the first white balance adjustment.

2. The electronic camera according to claim 1, wherein said setting section further sets a second white balance adjustment different from said first white balance adjustment with respect to a remaining area of the main image data other than the second block areas.

3. The electronic camera according to claim 1, wherein the first block areas are extracted so as to satisfy a predetermined condition determined from the preliminary image data.

4. The electronic camera according to claim 1, wherein the exposure control section calculates an average value of predetermined block areas in the preliminary image data and the first block areas are extracted based on the average value and the preliminary image data.

5. An electronic camera for electrically photographing a subject in an environment illuminated by steady light rays, comprising:
- an illuminating unit configured to illuminate the subject with preliminary light rays, and to illuminate the subject with main light rays for actual exposure after illumination by the preliminary light rays;
- an exposure control section configured to control an exposure of an image of the subject illuminated with the preliminary light rays to generate preliminary image data, and to control an exposure of an image of the subject illuminated with the main light rays to generate main image data, said preliminary image data including first block areas corresponding to a part of the subject which is mainly illuminated with the preliminary light rays and a first remaining area corresponding to a remaining part of the subject which is mainly illuminated with the steady light rays, and said main image data including second block areas corresponding to the first block areas and a second remaining area corresponding the first remaining area;
- an extracting section configured to extract the first block areas from the preliminary image data; and
- a setting section configured to set the exposure control section in a first white balance adjustment mode after the extraction of the first block areas, in which the exposure control section applies a first white balance adjustment to the second block areas and a second white balance adjustment to the second remaining area.

6. The electronic camera according to claim 5, wherein said exposure control section controls an exposure of an image of the subject in which the subject is illuminated by the steady light rays and not preliminary light rays and no main light rays to acquire steady light image data, and said exposure control section calculates a target light illumination amount for an actual exposure period for causing the subject to be illuminated with the main light rays for the actual exposure, based on the steady light image data and the preliminary image data, and the first block areas are extracted based on the steady light image data and the target light illuminating amount for the actual exposure period.

7. The electronic camera according to claim 5, wherein the first block areas are extracted so as to satisfy a predetermined condition determined from the preliminary image data.

8. The electronic camera according to claim 5, wherein the exposure control section calculates an average value of predetermined block areas in the preliminary image data and the first block areas are extracted based on the average value and the preliminary image data.

9. An electronic camera for electronically photographing a subject in an environment illuminated by steady light rays, comprising:
- an illuminating unit configured to illuminate the subject with preliminary light rays, and to illuminate the subject with main light rays for actual exposure after illumination by the preliminary light rays;
- an exposure control section configured to control an exposure of an image of the subject illuminated with the preliminary light rays to generate preliminary image data, and to control an exposure of an image of the subject illuminated with the main light rays to generate main image data, said preliminary image data including first block areas corresponding to a part of the subject which is mainly illuminated with the preliminary light rays and a first remaining area corresponding to a remaining part of the subject which is mainly illuminated with the steady light rays, and said main image data including second block areas corresponding to the first block areas and a second remaining area corresponding the first remaining area;
- an extracting section configured to extract the first block areas from the preliminary image data;
- a counting section configured to count a number of the extracted first block areas;
- a setting section configured to set the exposure control section in a first white balance adjustment mode if the number of the extracted first block areas is not less than a predetermined value, and to set the exposure control section in a second white balance adjustment mode if the number of the extracted first block areas is less than the predetermined value;
- wherein in the first white balance adjustment mode the exposure control section applies a first white balance adjustment to the second block areas and applies a second white balance adjustment to the second remaining area, and in the second white balance adjustment mode the exposure control section applies the second white balance adjustment to both the second block areas and the second remaining area.

10. The electronic camera according to claim 9, wherein the first block areas are extracted so as to satisfy a predetermined condition determined from the preliminary image data.

11. The electronic camera according to claim 9, wherein the exposure control section calculates an average value of predetermined block areas in the preliminary image data and the first block areas are extracted based on the average value and the preliminary image data.

12. The electronic camera according to claim 11, wherein said exposure control section controls an exposure of an image of the subject in which the subject is illuminated by the steady light rays and not preliminary light rays and no main light rays to acquire steady light image data, and said exposure control section calculates a target light illumination amount for an actual exposure period for causing the subject to be illuminated with the main light rays for the actual exposure, based on the steady light image data and the preliminary image data, and the first block areas are extracted based on the steady light image data and the target light illuminating amount for the actual exposure period.

* * * * *